United States Patent
Nelogal et al.

(10) Patent No.: US 10,007,638 B2
(45) Date of Patent: Jun. 26, 2018

(54) ASYNCHRONOUS NOTIFICATION INCLUDING PARAMETER VALUES IN SERIAL ADVANCED TECHNOLOGY ATTACHMENT PROTOCOL

(71) Applicant: Dell Products, LP, Round Rock, TX (US)

(72) Inventors: Chandrashekar Nelogal, Round Rock, TX (US); David M. Pereira, Austin, TX (US); Gary E. Billingsley, Austin, TX (US)

(73) Assignee: DELL PRODUCTS, LP, Round Rock, TX (US)

( * ) Notice: Subject to any disclaimer, the term of this patent is extended or adjusted under 35 U.S.C. 154(b) by 280 days.

(21) Appl. No.: 14/937,407

(22) Filed: Nov. 10, 2015

(65) Prior Publication Data
US 2017/0132169 A1    May 11, 2017

(51) Int. Cl.
G06F 13/42  (2006.01)
G06F 13/40  (2006.01)
G06F 13/38  (2006.01)

(52) U.S. Cl.
CPC ........ G06F 13/4239 (2013.01); G06F 13/385 (2013.01); G06F 13/4068 (2013.01); G06F 13/4282 (2013.01)

(58) Field of Classification Search
CPC .. G06F 12/0246; G06F 3/0679; G06F 3/0619; G06F 3/0659; G06F 11/00; G06F 11/006; G06F 11/008
See application file for complete search history.

(56) References Cited

U.S. PATENT DOCUMENTS

| | | |
|---|---|---|
| 5,890,014 A | 3/1999 | Long |
| 6,412,045 B1 | 6/2002 | Dekoning et al. |
| 6,722,570 B1 | 4/2004 | Eisele |

(Continued)

OTHER PUBLICATIONS

"Dual-Core Intel® Xeon® Processor 5100 Series Datasheet," Reference No. 313355-003, Aug. 2007 http://www.intel.com/Assets/PDF/datasheet/313355.pdf, (Section 6.3—Platform Environment Control Interface (PECI)).

(Continued)

*Primary Examiner* — Brian T Misiura
(74) *Attorney, Agent, or Firm* — Larson Newman, LLP

(57) ABSTRACT

An information handling system and method provide for receiving, at an information storage device, a specification of reporting criteria for a plurality of information storage device parameters, receiving a specification of logical relationships for the reporting criteria, monitoring information storage device parameter values for the information storage device parameters, comparing the information storage device parameter values to the reporting criteria to obtain indications of whether the reporting criteria have been satisfied, applying the logical relationships to the indications, and, in response to the logical relationships applied to the indications yielding a first result, transmitting an alert notification including information storage device parameter values in the form of a single contiguous message for which a corresponding command to send the single contiguous message has not been received by the information storage device.

17 Claims, 11 Drawing Sheets

(56) References Cited

U.S. PATENT DOCUMENTS

| | | |
|---|---|---|
| 6,792,460 B2 | 9/2004 | Oulu et al. |
| 6,918,134 B1 | 7/2005 | Sherlock et al. |
| 7,231,476 B2 | 6/2007 | Watt et al. |
| 7,657,794 B2 | 2/2010 | Ichikawa et al. |
| 7,802,019 B2 * | 9/2010 | Shu ................ G06F 11/0727 710/8 |
| 8,185,784 B2 * | 5/2012 | McCombs ........... G06F 11/004 714/47.2 |
| 8,949,863 B1 * | 2/2015 | Coatney ............. G06F 11/079 714/43 |
| 8,990,449 B2 | 3/2015 | Mundt et al. |
| 8,996,751 B2 | 3/2015 | Pereira et al. |
| 9,063,966 B2 * | 6/2015 | Patil ................ G06F 11/3034 |
| 2006/0047899 A1 | 3/2006 | Ilda et al. |
| 2008/0126885 A1 | 5/2008 | Tangvald et al. |
| 2008/0133624 A1 | 6/2008 | Phillips et al. |
| 2012/0246386 A1 | 9/2012 | Akutsu et al. |
| 2012/0295084 A1 | 11/2012 | Zheng et al. |
| 2013/0132696 A1 | 5/2013 | Tomida et al. |
| 2013/0317657 A1 | 11/2013 | Mundt et al. |
| 2014/0108759 A1 | 4/2014 | Iwamitsu et al. |
| 2014/0173268 A1 * | 6/2014 | Hashimoto ......... G06F 11/0754 713/2 |
| 2014/0201396 A1 * | 7/2014 | Pereira ................ G06F 13/382 710/15 |

OTHER PUBLICATIONS

"CPU Monitoring With DTS/PECI," Michael Berktold et al., Intel Corporation, paper 322683, Sep. 2010 http://download.intel.com/design/intarch/papers/322683.pdf.

"DDR3 migration to DDR4; DIMM Thermal Sensor and SPD Changes," Guru Prasad, NXP, BL Interface Products, Oct. 5, 2011, http://sites.amd.com/us/Documents/TFE2011_012NXP.pdf.

"System Memory Power and Thermal Management in Platforms Built on Intel® Centrino® Duo Mobile Technology," Intel Technology Journal, vol. 10, Issue 02, May 15, 2006, http://www.intel.com/technology/itj/2006/volume10issue02/art04_Memory_Power_Management/p01_abstract.htm.

* cited by examiner

| BYTE \ BIT | 7 | 6 | 5 | 4 | 3 | 2 | 1 | 0 |
|---|---|---|---|---|---|---|---|---|
| 0 | PS 733 | SPF 732 | \multicolumn{6}{c}{Page Code (TBD) 731} |
| 1 | \multicolumn{8}{c}{Page Length 736} |
| 2 | CTB 744 | TNE 743 | \multicolumn{3}{c}{MRIEO 742} | \multicolumn{3}{c}{Reserved 741} |
| 3 | \multicolumn{5}{c}{Reserved 748} | \multicolumn{2}{c}{IUFT 747} | HystCount 746 |
| 4 | \multicolumn{8}{c}{Notification Interval (seconds) 751} |
| 5 | (MSB) | | | | | | | |
| 6 | | | | | | | | (LSB) 752 |
| 7 | \multicolumn{8}{c}{Positive Parameter Value Range 753} |
| 8 | \multicolumn{8}{c}{Negative Parameter Value Range 754} |
| 9 | (MSB) | | | | | | | |
| 10 | | | | | | | | (LSB) 755 |
| 11 | TAM 765 | \multicolumn{3}{c}{TAM Code 764} | \multicolumn{2}{c}{Reserved 763} | NRE 762 | PRE 761 |

*FIG. 7*

| BYTE | |
|---|---|
| 0 | SMART Error Log Version — 820 |
| 1 | Error Log Index — 821 |
| 2..91 | First Error Log Data Structure — 822 |
| 92..181 | Second Error Log Data Structure — 823 |
| 182..271 | Third Error Log Data Structure — 824 |
| 272..361 | Fourth Error Log Data Structure — 825 |
| 362..451 | Fifth Error Log Data Structure — 826 |
| 452..453 | Device Error Count — 827 |
| 454..510 | Reserved — 828 |
| 511 | Data Structure Checksum — 829 |

|   | Byte 3 | Byte 2 | Byte 1 | Byte 0 |
|---|---|---|---|---|
| 0 | Error(7:0) | Status(7:0) | R \| I \| R \| P \| PM Port | FIS Type (34h) |
| 1 | Device(7:0) | LBA(23:16) | LBA (15:8) | LBA (7:0) |
| 2 | Reserved(0) | LBA(47:40) | LBA (39:32) | LBA (31:24) |
| 3 | Reserved(0) | Reserved(0) | Count(15:8) | Count(7:0) |
| 4 | Parameter ID | Parameter Flags | Parameter Value (15:8) | Parameter Value (7:0) |

*FIG. 9*

| FIS | Byte # | Bit # | Current Definition | Proposed Definition |
|---|---|---|---|---|
|  | 01h | 4 | Reserved | Parameter info presence indicator |
|  | 0Fh | All | Reserved | Parameter ID |
|  | 0Eh | All | Reserved | Parameter Flags |
|  | 0Ch & 0Dh | All | Reserved | Parameter Value |

*FIG. 10*

|   | Byte 3 | Byte 2 | | | Byte 1 | | | | | Byte 0 |
|---|---|---|---|---|---|---|---|---|---|---|
| 0 | Error(7:0) | Status Hi | R | Status Lo | N | I | R | P | PM Port | FIS Type (A1h) |
| 1 | Parameter ID | Parameter Flags | | | Parameter Value (15:8) | | | | | Parameter Value (7:0) |

*FIG. 11*

| FIS | Byte # | Bit # | Current Meaning | Proposed Meaning |
|---|---|---|---|---|
| A1h | 01h | 4 | Reserved | P = Parameter info presence indicator. The N, I and Status fields will be ignored when processing parameter information. |
| | 07h | All | Protocol specific | Parameter ID |
| | 06h | All | Protocol specific | Parameter Flags |
| | 05h and 04h | All | Protocol specific (See above) | Parameter Value |

*FIG. 12*

| | Byte 3 | Byte 2 | Byte 1 | | | | | Byte 0 |
|---|---|---|---|---|---|---|---|---|
| 0 | Reserved | Reserved | R | I | R | P | PM Port | FIS Type (XXh) |
| 1 | Parameter ID | Flags | Parameter Value (15:8) | | | | | Parameter Value (7:0) |
| 2 | Parameter ID | Flags | Parameter Value (15:8) | | | | | Parameter Value (7:0) |
| 3 | Parameter ID | Flags | Parameter Value (15:8) | | | | | Parameter Value (7:0) |
| 4 | Parameter ID | Flags | Parameter Value (15:8) | | | | | Parameter Value (7:0) |
| 5 | Parameter ID | Flags | Parameter Value (15:8) | | | | | Parameter Value (7:0) |
| 6 | Parameter ID | Flags | Parameter Value (15:8) | | | | | Parameter Value (7:0) |
| 7 | Parameter ID | Flags | Parameter Value (15:8) | | | | | Parameter Value (7:0) |

*FIG. 13*

ASYNCHRONOUS NOTIFICATION INCLUDING PARAMETER VALUES IN SERIAL ADVANCED TECHNOLOGY ATTACHMENT PROTOCOL

FIELD OF THE DISCLOSURE

The present disclosure generally relates to information handling systems, and more particularly relates to notification of a condition within an information handling system.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIG. 7 is a block diagram illustrating a mode page according to an embodiment of the present disclosure; and FIG. 8 is a block diagram illustrating a Self-Monitoring, Analysis and Reporting Technology (SMART) error log page as may represent information according to an embodiment of the present disclosure.

FIG. 9 is a table illustrating a structure of register device to host FIS (34h) configured to provide alert notification with information storage device parameter values.

FIG. 10 is a table illustrating a proposed definition of SATA device-to-host FIS 34h.

FIG. 11 is a table illustrating a structure of SATA FIS A1h (Set Device Bits—Device to Host) configured to communicate a parameter ID, parameter flags, and a parameter value.

FIG. 12 is a table illustrating a proposed definition of SATA FIS A1h.

FIG. 13 is a table illustrating a proposed new device to host FIS (XXh) structure.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

In accordance with at least one embodiment, a system and method is described for initially configuring and then monitoring and reporting multiple parameters, wherein priority amongst the parameters can be specified. An asynchronous event reporting mechanism is provided which enables reporting of parameter values and not just events over an input-output (I/O) interface, for example, an Advanced Technology Attachment (ATA) interface. Multiple parameter values can be reported as part of a single notification, for example, according to a new frame information structure (FIS). By enabling a device, such as an information storage device, to report actual parameter values at the time of notification, the time and need to communicate a command from a host for a query operation can be avoided. The host is able to set up thresholds for reporting, and the device can send parameter value(s) at the time of asynchronous notification.

Figure 1:
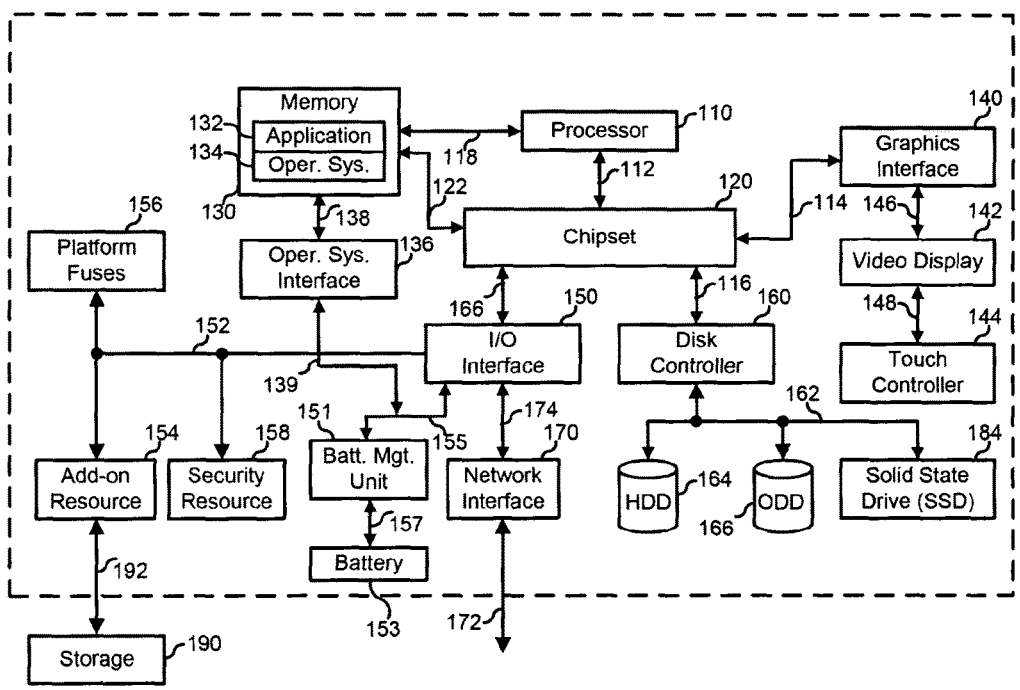
FIG. 1 is a block diagram illustrating an information handling system according to an embodiment of the present disclosure.

FIG. 1 illustrates a generalized embodiment of information handling system 100. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described above, and operates to perform one or more of the methods described above. Information handling system 100 includes a processor 110, a chipset 120, a memory 130, a graphics interface 140, a disk controller 160, an input/output (I/O) interface 150, and a network interface 170. Processor 110 is connected to chipset 120 via processor interface 112. Processor 110 is connected to memory 130 via memory bus 118. Memory 130 is connected to chipset 120 via a memory bus 122. Graphics interface 140 is connected to chipset 120 via a graphics interface 114, and provides a video display output 146 to a video display 142. Video display is connected to touch controller 144 via touch controller interface 148. In a particular embodiment, information handling system 100 includes separate memories that are dedicated to processor 110 via separate memory interfaces. An example of memory 130 includes random access memory (RAM) such as static RAM (SRAM), dynamic RAM (DRAM), non-volatile RAM (NV-RAM), or the like, read only memory (ROM), another type of memory, or a combination thereof. Memory 130 can store, for example, at least one application 132 and operating system 134. Operating system 134 includes operating system code operable to detect resources within information handling system 100, to provide drivers for the resources, initialize the resources, to access the resources, and to support execution of the at least one application 132. Operating system 134 has access to system elements via an operating system interface 136. Operating system interface 136 is connected to memory 130 via connection 138.

Battery management unit (BMU) 151 is connected to I/O interface 150 via battery management unit interface 155. BMU 151 is connected to battery 153 via connection 157. Operating system interface 136 has access to BMU 151 via connection 139, which is connected from operating system interface 136 to battery management unit interface 155.

Graphics interface 140, disk controller 160, and I/O interface 150 are connected to chipset 120 via interfaces that may be implemented, for example, using a Peripheral Component Interconnect (PCI) interface, a PCI-Extended (PCI-X) interface, a high-speed PCI-Express (PCIe) interface, another industry standard or proprietary communication interface, or a combination thereof. Chipset 120 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof.

Disk controller 160 is connected to chipset 120 via connection 116. Disk controller 160 includes a disk interface 162 that connects the disc controller to a hard disk drive (HDD) 164, to an optical disk drive (ODD) 166, and to a solid-state drive 184. An example of disk interface 162 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof.

I/O interface 150 is connected to chipset 120 via connection 166. I/O interface 150 includes a peripheral interface 152 that connects the I/O interface to an add-on resource 154, to platform fuses 156, and to a security resource 158. Peripheral interface 152 can be the same type of interface as connects graphics interface 140, disk controller 160, and I/O interface 150 to chipset 120, or can be a different type of interface. As such, I/O interface 150 extends the capacity of such an interface when peripheral interface 152 and the I/O channel are of the same type, and the I/O interface translates information from a format suitable to such an interface to a format suitable to the peripheral channel 152 when they are of a different type. Add-on resource 154 can include a data storage system, an additional graphics interface, a network interface card (NIC), a sound/video processing card, another add-on resource, or a combination thereof. As an example, add-on resource 154 is connected to data storage system 190 via data storage system interface 192. Add-on resource 154 can be on a main circuit board, on separate circuit board or add-in card disposed within information handling system 100, a device that is external to the information handling system, or a combination thereof.

Network interface 170 represents a NIC disposed within information handling system 100, on a main circuit board of the information handling system, integrated onto another component such as chipset 120, in another suitable location, or a combination thereof. Network interface 170 is connected to I/O interface 150 via connection 174. Network interface device 170 includes network channel 172 that provides an interface to devices that are external to information handling system 100. In a particular embodiment, network channel 172 is of a different type than peripheral channel 152 and network interface 170 translates information from a format suitable to the peripheral channel to a format suitable to external devices. An example of network channels 172 includes InfiniBand channels, Fibre Channel channels, Gigabit Ethernet channels, proprietary channel architectures, or a combination thereof. Network channel 172 can be connected to external network resources (not illustrated). The network resource can include another information handling system, a data storage system, another network, a grid management system, another suitable resource, or a combination thereof.

Figure 2:
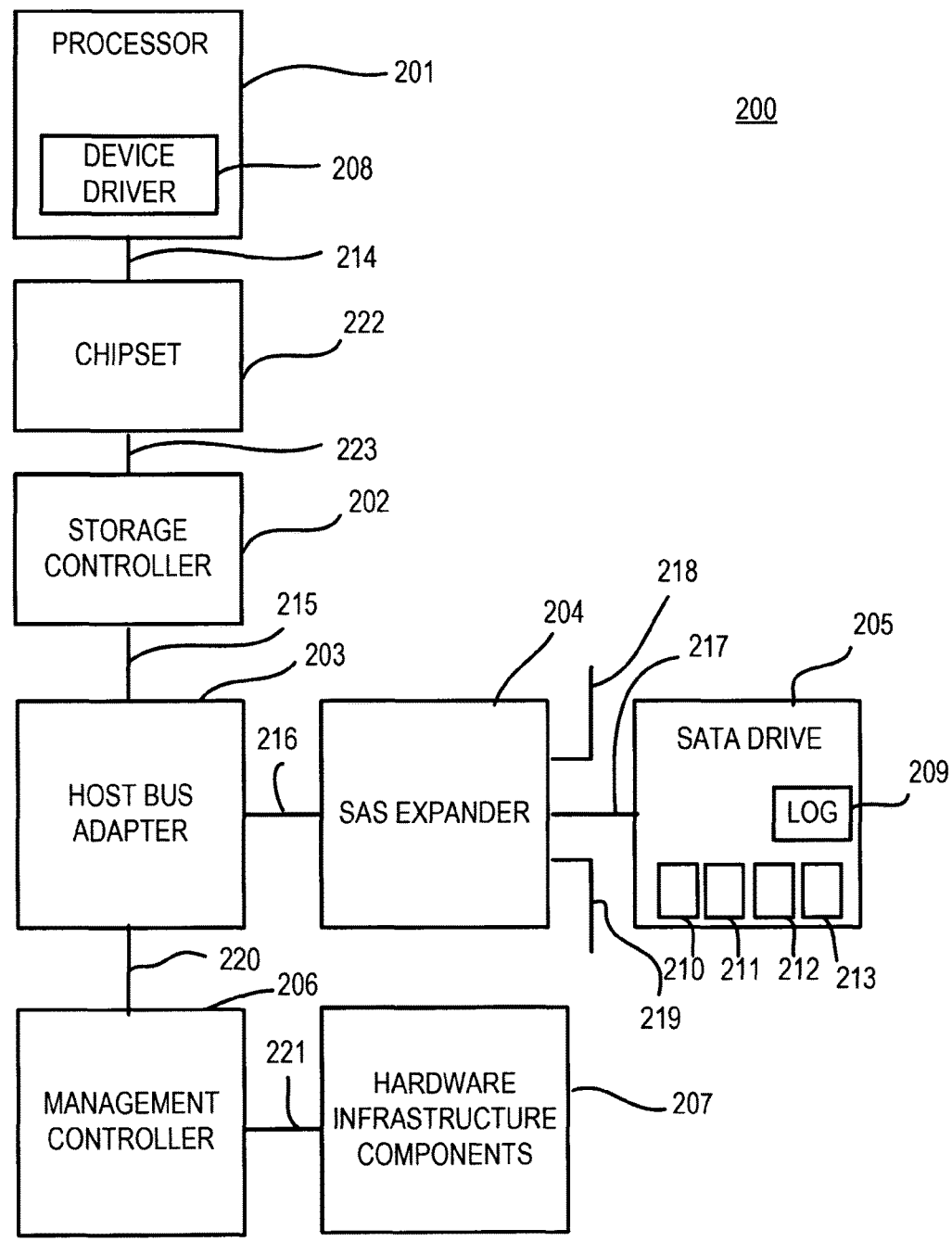
FIG. 2 is a block diagram illustrating a portion of an information handling system according to an embodiment of the present disclosure.

FIG. 2 shows a portion of an information handling system according to an embodiment of the present disclosure. Portion 200 of an information handling system comprises processor 201, chipset 222, storage controller 202, host bus adapter 203, serial attached small computer serial interface (SAS) expander 204, serial advanced technology attachment (SATA) drive 205, management controller 206, and hardware infrastructure component 207. Processor 201 can execute instruction code to implement features such as device driver 208, which provides a mechanism for other operating system features and application programs to interact with SATA drive 205. Processor 201 can be implemented as, for example, processor 110 of FIG. 1. Processor 201 is connected to chipset 222 via connection 214. Chipset 222 can be implemented as, for example, chipset 120 of FIG. 1. Chipset 222 is connected to storage controller 202 via connection 223. Storage controller 202 can be implemented, for example, as disk controller 160 of FIG. 1. Storage controller 202 is connected to host bus adapter 203 via connection 215. Host bus adapter 203 is connected to SAS expander 204 via connection 216. SAS expander 204 is connected to SATA drive 205 via connection 217. SATA drive 205 can be implemented as, for example, HDD 164, ODD 166, or SSD 184 of FIG. 1. While FIG. 2 shows SATA drive 205 connected through SAS expander 204, and host bus adapter 203 to storage controller 202, other embodiments may or may not include host bus adapter 203 or SAS expander 204, as shown, for example, in FIG. 1. As another example, circuitry providing the functionality of storage controller 202 can be included in chipset 222. As an example, chipset 222 can provide a SATA port, which can be connected directly or indirectly to SATA drive 205.

SAS expander can also be connected to other devices, such as other SATA drives, via, for example, connections 218 and 219. SATA drive comprises, in addition to its data storage medium, log 209, sensors 210, 211, and 212, and event generating device 213, which may, for example, be a pushbutton switch. The data storage medium may, for example, be a hard disk drive or a flash memory drive. Log 209 may, for example, be a Self-Monitoring, Analysis and Reporting Technology (SMART) error log for logging errors and other indicators of potential drive unreliability and possible impending failure. Host bus adapter 103 is connected to management controller 206 via connection 220. Management controller 206 is connected to hardware infrastructure components 207 via connection 221. Management controller 206 may, for example, be a baseboard management controller (BMC). Hardware infrastructure components 207 may include, for example, fans, sensors, and other devices to provide power, thermal, and other management resources to support the information handling system.

Figure 3:
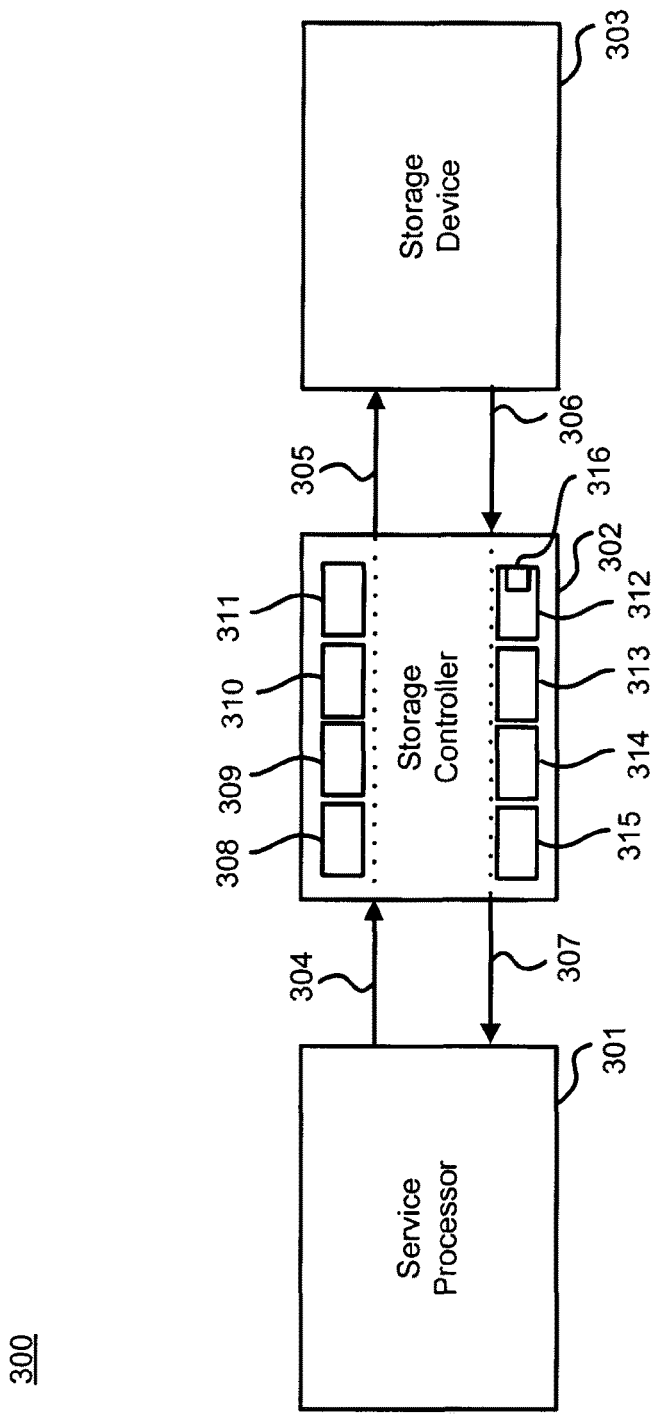
FIG. 3 is a block diagram illustrating a service processor, a storage controller, and a storage device and communications between such elements according to an embodiment of the present disclosure.

FIG. 3 shows a service processor, a storage controller, and a storage device and communications between such elements according to an embodiment of the present disclosure. Service processor 301 can send commands, such as commands 308, 309, 310, and 311 to storage device 303 via storage controller 302, for example, via connection 304 from service processor 301 to storage controller 302 and via connection 305 from storage controller 302 to storage device 303. Storage device 303 can send responses to the commands, such as responses 312, 313, 314, and 315 to service processor 301 via storage controller 302, for example, via connection 306 from storage device 303 to storage controller 302 and via connection 307 from storage controller 302 to service processor 301. For example, an alert notification comprising the information storage device parameter values included as part of a return status can be sent from the information storage device to the processor as a response to a command issued by the processor to the information storage device. As commands are queued to be sent from service processor 301 to storage device 303 and responses are queued to be sent from storage device 303 to service processor 301, such queuing can introduce latency to attempts to quickly transmit a message, for example, a message that may be more urgent than typical data communications. While commands 308-311 are shown as being sent from service processor 301 through storage controller 302 to storage device 303, and responses 312-315 are shown as being sent from storage device 303 through storage controller 302 to service processor 301, commands can responses can be sent and received along various paths. For example, referring to FIG. 2, processor 201 can originate the majority of commands, which can pass through chipset 222, storage controller 202, host bus adapter 203, and SAS expander 204 to SATA drive 205, and processor 201 can receive the majority of responses from SATA drive 205 via SAS expander 204, host bus adapter 203, storage controller 202, and chipset 222. However, management controller 206 can also originate commands, which can pass through host bus adapter 203 and SAS expander 204 to SATA drive 205, and management controller 206 can receive responses from SATA drive 205 via SAS expander 204 and host bus adapter 203. As another example, the commands and responses between management controller 206 and SATA drive 205 can be mediated by storage controller 202. Storage controller 202 can monitor traffic from SATA drive 205 for alert notifications and, when storage controller 202 observes an alert notification, it can forward the alert notification to management controller 206.

As an example, if storage device 303 transmits an alert notification without parameter values to service processor 301, the alert notification would follow any other traffic already in the queue, thereby delaying it from reaching service processor 301. If service processor 301 receives the alert notification without parameter values indicative of why the alert notification was sent, service processor 301 may transmit a command to have storage device 303 return a page, such as a log page, that can communicate the parameter values from storage device 303 to service processor 301. However, such a command would have to traverse the queue from service processor 301 to storage device 303, and the response to the command would have to traverse the queue from storage device 303 to service processor 301. Accordingly, the cumulative delay of the alert notification, the command, and the response to the command would involve two traversals of the queue from storage device 303 to service processor 301 and one traversal of the queue from service processor 301 to storage device 303.

To avoid such latency, instead of sending an alert notification devoid of parameter values, storage device 303 can include the pertinent parameter values in the alert notification message, which can avoid one traversal of the queue from service processor 301 to storage device 303 and one traversal of the queue from storage device 303 to service processor 301. To avoid any further queuing, such as queuing internal to storage device 303 of responses to be sent from storage device 303 to service processor 301, when traffic is present in the queue from storage device 303 to service processor 301, storage device 303 can insert the alert notification in another response that is already queued for transmission, thereby avoiding additional queuing delay. For example, storage device 303 can insert alert notification 316 including parameter values from storage device 303 in response 312, which may be a response to a previous command, such a command received by the storage device before commands 308 through 311. Thus, alert notification 316 including parameter values can be dispatched from storage device 303 immediately upon detecting a condition for sending the alert notification without any latency from transmission of a command via connections 304 and 305. Therefore, the alert notification including parameter values can be quickly and efficiently transmitted from storage device 303 to service processor 301.

To configure storage device 303 to provide an alert notification including storage device parameter values, service processor 301 provides configuration information via I/O bus 304 to storage controller 302. Storage controller 302 provides configuration information via I/O bus 305 to information storage device 303. The configuration information may include, for example, reporting criteria and logical relationships between such reporting criteria or indications obtained from comparing such reporting criteria to information storage device parameter values. As an example, the information of the mode page of FIG. 7 may be provided to information storage device 303 to configure information storage device 303 to provide an alert notification including information storage device parameter values.

Information storage device 303 provides an alert notification including information storage device parameter values. Information storage device 303 may provide the alert notification, for example, via an I/O bus 306 coupled to the information storage device 303. Storage controller 302 may receive the alert notification and forward the alert notification via I/O bus 307 to service processor 301. The alert notification 316 may, as one example, be included in a response 312 corresponding to a command previously received by storage device 303, wherein the command and its response 312 are otherwise unrelated to alert notification 316. As another example, storage device 303 may send a message in the form of response 312 comprising alert notification 316 including information storage device parameter values, wherein the message does not correspond to a received command but is instead spontaneously sent by storage device 303 when criteria specified in advance for the sending of the alert notification are met.

Storage devices monitor various internal parameters throughout their run time and check against preset thresholds, if applicable, and alert the connected host (such as a processor executing instructions in the form of an application client) in response to the parameters exceeding thresholds. This is usually referred to as SMART implementation.

With a SATA protocol, the SMART parameters can be read via the SMART RETURN STATUS command to determine if any parameter has crossed a threshold. Only a certain set of parameters is monitored for threshold exceeded condition(s). Further, the host would issue another command, SMART READ DATA, to actually get the current values of the parameters being monitored to exactly obtain the parameter value or values that had crossed the threshold or thresholds.

The SATA Command protocol called Advanced Technology Attachment (ATA) Command Set 3 (ACS 3) defines media access/data transfer commands such as read and write operations to be issued as queued commands to the device. Any non-media access commands such as the commands mentioned above, would be issued, processed, and completed one at a time. This means the host issuing the SMART related commands would have to wait for all the media access commands in the device queue to complete in order to issue the SMART commands. This leads to degradation of I/O performance. In addition to the SMART parameters, there are other parameters, e.g., excursion of drive temperature from desired operational temperature range, which may be usefully employed to the system/host. Such information may be crucial in enabling the host to take corrective action in a timely manner. There is no mechanism provided in the existing SATA protocol to asynchronously notify the host of these conditions without impacting the I/O performance of the drive/host. Accordingly, in accordance with at least one embodiment, a mechanism to asynchronously communicate drive parameter values without impacting I/O performance is described herein.

A storage device can be configured to avoid unnecessary delay and promptly provide information storage device parameter values via a bus, such as a SATA bus, to a processor by introducing the parameter values into an alert notification transmitted promptly (such as asynchronously with respect to an established pattern of commands and responses to the commands) via the bus even before existing bus traffic has cleared, wherein the existing bus traffic includes both commands from the processor to the storage device and responses from the storage device to the processor. In accordance with at least one embodiment, the storage device modifies existing SATA frame information structures (FISs) to include the alert notification with the information storage device parameter values. In accordance with at least one other embodiment, a new FIS is provided exclusively for asynchronous notification to communicate the alert notification with the information storage device parameter values from the information storage device via the bus to the processor. In either case, the processor can specify the parameters and can specify the acceptable and notification ranges of the parameter values.

At least one embodiment of notification by modifying an existing FIS can be implemented by modifying a register device to host FIS (34h), as described in detail below with reference to FIGS. 9-10.

FiG. 9 is a table illustrating a structure of register device to host FIS (34h) configured to provide alert notification with information storage device parameter values.

As shown in FIG. 9, the register device to host FIS (34h) configured to provide alert notification with information storage device parameter values comprises five blocks, numbered 0 to 4, each comprising four bytes, numbered 3 to 0 from most significant to least significant. In block 4, byte 3 provides a Parameter ID, byte 2 provides Parameter Flags, byte 1 provides a most significant byte of a Parameter Value (such as bits 15:8), and byte 0 provides a least significant byte of the Parameter Value (such as bits 7:0).

FIG. 10 is a table illustrating a proposed definition of SATA device-to-host FIS 34h

As shown in FIG. 10, bit number of 4 of byte 01h (shown in FIG. 9 as bit 4 of byte 1 of block 0) is used as a parameter info presence indicator to indicate the presence of information storage device parameter information in the FIS. The information storage device parameter information includes a parameter ID in byte 0Fh (shown in FIG. 9 as byte 3 of block 4), parameter flags in byte 0Eh (shown in FIG. 9 as byte 2 of block 4), and a parameter value in bytes 0Ch and 0Dh (with byte 0Dh shown in FIG. 9 as the most significant byte in byte 1 of block 4 and with byte 0Ch shown as the least significant byte in byte 0 of block 4).

If the Parameter Info Presence Indicator—P—(such as bit number 4 of byte 01h) is set, a specified field (such as block 4 of FIG. 9, which has heretofore been designated as "reserved") will be interpreted as the parameter field as described below. The Parameter ID of byte 0Fh denotes the identity of the parameter for which information is being transmitted in the FIS. The Parameter Flags of byte 0Eh indicate the following: Raw or normalized value, Parameter Value is above upper bound, Parameter Value is below lower bound, Notification Enabled —reflects the state from the log page, Monitoring Enabled —reflects the state from the log page, Parameter Valid —Indicates whether a parameter and the reported values are valid or not. The Parameter Value of bytes 0Ch and 0Dh provide the value of the parameter. Unlike a traditional SATA interface, the host is configured to properly handle an unsolicited FIS that may be unrelated to a command completion.

At least one embodiment of notification by modifying an existing FIS can be implemented by configuring a set device bits FIS (A1h) to include an alert notification having information storage device parameter values, as described in detail below with reference to FIGS. 11 and 12.

FIG. 11 is a table illustrating a structure of SATA FIS A1h (Set Device Bits—Device to Host) configured to communicate a parameter ID, parameter flags, and a parameter value.

As shown in FIG. 11, the set device bits device to host FIS (A1h) configured to provide alert notification with information storage device parameter values comprises two blocks, numbered 0 to 1, each comprising four bytes, numbered 3 to 0 from most significant to least significant. In block 1, byte 3 provides a Parameter ID, byte 2 provides Parameter Flags, byte 1 provides a most significant byte of a Parameter Value (such as bits 15:8), and byte 0 provides a least significant byte of the Parameter Value (such as bits 7:0).

FIG. 12 is a table illustrating a proposed definition of SATA FIS A1h.

As shown in FIG. 12, bit number of 4 of byte 01h (shown in FIG. 11 as bit 4 of byte 1 of block 0) is used as a parameter info presence indicator to indicate the presence of information storage device parameter information in the FIS. The information storage device parameter information includes a parameter ID in byte 07h (shown in FIG. 9 as byte 3 of block 1), parameter flags in byte 06h (shown in FIG. 9 as byte 2 of block 1), and a parameter value in bytes 04h and 05h (with byte 05h shown in FIG. 9 as the most significant byte in byte 1 of block 1 and with byte 04h shown as the least significant byte in byte 0 of block 1).

If the Parameter Info Presence Indicator—P—(such as bit number 4 of byte 01h) is set, the current protocol specific field (such as including bytes 07h, 06h, 05h, and 04h) will be interpreted as the parameter field as described below. The Parameter ID of byte 07h denotes the identity of the parameter for which information is being transmitted in the FIS. The Parameter Flags of byte 06h indicate the following: Raw or normalized value, Parameter Value is above upper bound, Parameter Value is below lower bound, Notification Enabled—reflects the state from the log page, Monitoring Enabled—reflects the state from the log page, Parameter Valid—Indicates whether a parameter and the reported values are valid or not. The Parameter Value of bytes 05h and 04h provide the value of the parameter. Unlike a traditional SATA interface, the host is configured to properly handle an unsolicited FIS that may be unrelated to a command completion.

For the set device bits device to host FIS (A1h), the host is configured to properly handle an unsolicited FIS that may be unrelated to a command completion. An alternative to setting the P bit (such as bit number 4 of byte 01h) can be implemented by setting the notification bit (such as bit number 7 of byte 1 of block 0 in FIG. 11) in the FIS and not setting the interrupt bit (such as bit number 6 of byte 1 of block 0 in FIG. 11) and utilizing bytes 04h through 07h (such as bytes 0 through 3 of block 1 of FIG. 11) for parameter information as described above.

In accordance with at least one embodiment, an alert notification comprising information storage device parameter values can be communicated from the information storage device to the host processor using a new Device to Host FIS (XXh, where XX can be any hexadecimal value not already used by an existing FIS).

A new FIS from device to host for alert notification including parameter information has a length of 32 bytes (16 words). The identifier for the FIS can be a value not assigned to an existing FIS and which the host processor can be configured to identify as corresponding to the new FIS. This FIS can be sent by the device at any time. The transmission of the new FIS is not necessarily aligned with any other FIS or any command completion. This means that the host can accept this FIS asynchronous to any other operation or event. On receipt of this FIS, the host makes the parameter information from the FIS available to the host or to processing units attached to the host.

FIG. 13 is a table illustrating a proposed new device to host FIS (XXh) structure.

As shown in FIG. 13, the new device to host FIS (XXh) is configured to provide alert notification with information storage device parameter values. The new device to host FIS (XXh) comprises eight blocks, numbered 0 to 7, each comprising four bytes, numbered 3 to 0 from most significant to least significant. In block 0, byte 0 identifies the FIS type with an eight-bit value unique to the new device to host FIS. In block 0, byte 1 includes bits 0 to 3 identifying a port multiplier (PM) port, bit 4 denoting that the new device to host FIS (XXh) contains parameter information, bits 5 and 7 reserved for future use, and bit 6 as an interrupt bit. Bytes 2 and 3 of block 0 are reserved for future use. Blocks 1 through 7 are used to communicate parameter information. In each of blocks 1 through 7, byte 3 provides a Parameter ID, byte 2 provides Parameter Flags, byte 1 provides a most significant byte of a Parameter Value (such as bits 15:8), and byte 0 provides a least significant byte of the Parameter Value (such as bits 7:0).

TABLE 1

New FIS definition

| FIS | Byte # | Bit # | Proposed meaning |
|---|---|---|---|
| XXh | 00h | All | FIS identifier |
|  | 01h | 4 | P = Parameter info presence indicator |
|  | 02h | All | Reserved |
|  | 03h | All | Reserved |
|  | 07h | All | Parameter ID = Identity of the parameter for which information is being transmitted in the FIS |
|  | 06h | All | Flags |
|  | 05h and 04h | All | First Parameter value |
| ... | ... | ... | ... |
|  | 1fh | All | Parameter ID = Identity of the parameter for which information is being transmitted in the FIS |
|  | 1eh | All | Flags |
|  | 1dh and 1ch | All | Last Parameter value |

As shown in Table 1, byte 00h (shown in FIG. 13 as byte 0 of block 0) identifies the new device to host FIS (XXh). Bit number of 4 of byte 01h (shown in FIG. 13 as bit 4 of byte 1 of block 0) is used as a parameter info presence indicator to indicate the presence of information storage device parameter information in the FIS. Bytes 02h and 03h (shown in FIG. 13 as bytes 2 and 3 of block 0) are reserved for future use. The information storage device parameter information includes up to seven instances of parameter IDs, parameter flags, and parameter values, as shown in FIG. 13. The first instance comprises a parameter ID in byte 07h (shown in FIG. 13 as byte 3 of block 1), parameter flags in byte 06h (shown in FIG. 13 as byte 2 of block 1), and a parameter value in bytes 05h and 04h (shown in FIG. 13 as bytes 1 and 0 of block 1). The second instance comprises a parameter ID in byte 0Bh (shown in FIG. 13 as byte 3 of block 2), parameter flags in byte 0Ah (shown in FIG. 13 as byte 2 of block 2), and a parameter value in bytes 09h and 08h (shown in FIG. 13 as bytes 1 and 0 of block 2). The third instance comprises a parameter ID in byte 0Fh (shown in FIG. 13 as byte 3 of block 3), parameter flags in byte 0Eh (shown in FIG. 13 as byte 2 of block 3), and a parameter value in bytes 0Dh and 0Ch (shown in FIG. 13 as bytes 1 and 0 of block 3). The fourth instance comprises a parameter ID in byte 13h (shown in FIG. 13 as byte 3 of block 4), parameter flags in byte 12h (shown in FIG. 13 as byte 2 of block 4), and a parameter value in bytes 11h and 10h (shown in FIG. 13 as bytes 1 and 0 of block 4). The fifth instance comprises a parameter ID in byte 17h (shown in FIG. 13 as byte 3 of block 5), parameter flags in byte 16h (shown in FIG. 13 as byte 2 of block 5), and a parameter value in bytes 15h and 14h (shown in FIG. 13 as bytes 1 and 0 of block 5). The sixth instance comprises a parameter ID in byte 1Bh (shown in FIG.13 as byte 3 of block 6), parameter flags in byte 1Ah (shown in FIG. 13 as byte 2 of block 6), and a parameter value in bytes 19h and 18h (shown in FIG. 13 as bytes 1 and 0 of block 6). The seventh instance comprises a parameter ID in byte 17h (shown in FIG. 13 as byte 3 of block 7), parameter flags in byte 1Eh (shown in FIG. 13 as byte 2 of block 7), and a parameter value in bytes 1Dh and 1Ch (with byte 01Dh shown in FIG. 9 as the most significant byte in byte 1 of block 4 and with byte 1Ch shown as the least significant byte in byte 0 of block 7).

New device to host FIS (XXh) can respond to parameter excursion conditions and, in a manner asynchronous with a sequential correspondence of responses transmitted by the information storage device to command received by the information storage device, send an alert notification including several storage device parameter values via the main I/O bus used by the storage device to a host processor. New device to host FIS (XXh) is backwards compatible with older storage devices not configured to handle new device to host FIS (XXh) since the new FIS will be ignored by older state machines. However, new storage devices or newly updated storage devices can include a definition of a state machine to make the storage devices act as senders of this new FIS, and new host processors or newly updated host processors can include a definition of a state machine to make the host processors act as receivers of this FIS.

A host processor can specify reporting methods for parameters and send such specification from the host processor to the storage device via the main I/O bus from which the storage device receives commands from the host processor. The selected log address comprises a set of pages with a page specifying the monitoring and reporting criteria for each parameter. A page can specify the following: monitoring frequency, reporting thresholds—upper and lower, reporting frequency, enable/disable monitoring, and enable/disable asynchronous reporting. Detailed information, such as parameter ID, parameter value, description, threshold crossing condition, etc., about the parameter can also be retrieved from the log page. In a Log Address (XXh) communication, the log page identifier/number can be fixed as part of a predetermined definition or during implementation. An example of the log page is shown below.

TABLE 2

Log page definition

|  |  | Bit 7 | Bit 6 | Bit 5 | Bit 4 | Bit 3 | Bit 2 | Bit 1 | Bit 0 |
|---|---|---|---|---|---|---|---|---|---|
| Byte 0 | Log Page Number | | | | | | | | |
| Byte 1 | Reserved | | | | | | | | |
| Byte 2 | Parameter Identifier | | | | | | | | |
| Byte 3 | Parameter Flags | | | | | | | | |
| Byte 4 | Parameter Value (7:0) | | | | | | | | |
| Byte 5 | Parameter Value (15:8) | | | | | | | | |
| Bytes 6:15 | Reserved | | | | | | | | |
| Byte 16 | Command | | Priority | | | Report | Report Low | Report High | Monitor |
| Byte 17 | Command | | | | | | Clear Excursion Counters | Clear Settings | Clear Parameter Values |
| Byte 18 | Parameter Identifier | | | | | | | | |
| Byte 19 | Parameter Specific | | | | | | | R/N | C/F |
| Bytes 20:21 | Upper Threshold value | | | | | | | | |
| Bytes 22:23 | Lower Threshold Value | | | | | | | | |
| Bytes 24:27 | Monitoring Frequency (ms) | | | | | | | | |
| Bytes 28:31 | Reporting frequency within range(ms) | | | | | | | | |
| Bytes 32:35 | Reporting frequency outside the range (ms) | | | | | | | | |

TABLE 2-continued

Log page definition

| | | Bit 7 | Bit 6 | Bit 5 | Bit 4 | Bit 3 | Bit 2 | Bit 1 | Bit 0 |
|---|---|---|---|---|---|---|---|---|---|
| Bytes 36:37 | Number of times upper threshold is crossed | | | | | | | | |
| Bytes 38:39 | Number of times lower threshold is crossed | | | | | | | | |
| Bytes 40:63 | Reserved | | | | | | | | |
| Bytes 64:95 | Text description | | | | | | | | |
| Bytes 96:511 | Reserved | | | | | | | | |

In the example above, the log page includes 512 bytes. Byte 0 identifies the Log Page Number. Byte 1 is reserved for future use. Byte 2 provides a Parameter Identifier. Byte 3 provides Parameter Flags. Byte 4 provides a least significant byte of a Parameter Value (7:0). Byte 5 provides a most significant byte of the Parameter Value (15:8). Bytes 6 through 15 are reserved for future use. Byte 16 provides the following values for a command: Priority, Report, Report Low, Report High, and Monitor. Monitor, when set, will enable monitoring of the parameter. Report High, when set, will enable asynchronous reporting of the parameter when the parameter crosses high threshold. Report Low, when set, will enable asynchronous reporting of the parameter when the parameter crosses the low threshold. Report, when set, will enable asynchronous reporting of the parameter at the specified reporting frequency. The parameter may be in the operational range and may not have crossed one of the set thresholds. Priority provides a relative reporting priority with/against other parameters being monitored by the drive. Byte 17 provides the following values for a command: Clear Excursion Counters, Clear Settings, and Clear Parameter Values. For Clear Parameter Values, when the log page is written with this bit set, the device shall clear the current parameter values. For Clear Settings, when the log page is written with this bit set, the device shall clear all settings related to parameter monitoring and reporting criteria. For Clear Excursion Counters, when the log page is written with this bit set, the device shall clear all excursion counters. Byte 18 provides a Parameter Identifier. Parameter Identity—a unique identifier for the parameter—e.g., the temperature parameter could have the ID as 00h. Byte 19 provides the following parameter specific values: R/N and C/F. C/F specifies Centigrade or Fahrenheit (Specific to temperature log page) and is set to indicate centigrade; otherwise Fahrenheit. R/N specifies a raw or normalized value (which can be specific to some parameters). When set, it reports a raw value; otherwise it reports a normalized value. Bytes 20 and 21 specify an Upper Threshold value. Upper Threshold Value specifies, when the parameter being monitored crosses above this value, the device shall start asynchronous reporting subject to reporting being enabled. Bytes 22 and 23 specify a Lower Threshold Value. Lower Threshold Value specifies, when the parameter being monitored crosses below this value, the device shall start asynchronous reporting subject to reporting being enabled. Bytes 24 to 27 specify a Monitoring Frequency (such as in milliseconds). Monitoring Frequency is the frequency at which the drive internally monitors the parameter if enabled for monitoring. Bytes 28 to 31 describe a reporting frequency within range (such as in milliseconds). Reporting frequency within the range specifies, when the parameter has not crossed either the upper or the lower threshold, the device would still report the parameter value at this frequency. Bytes 32 to 35 describe a reporting frequency outside the range (such as in milliseconds). Reporting frequency outside the range, when enabled for reporting (high or low), causes the device to report the parameter value asynchronously at this frequency when the parameter has crossed a threshold. Bytes 36 and 37 describe a number of times upper threshold is crossed. Number of times upper threshold is a count of the number of times the parameter has crossed the upper threshold. The counter is persistently maintained by the drive until it is cleared by host. It will be persistent across power cycles and other error conditions. Bytes 38 and 39 describe a number of times the parameter has crossed the lower threshold. The counter is persistently maintained by the drive until it is cleared by host. It will be persistent across power cycles and other error conditions. Bytes 40 through 63 are reserved for future use. Bytes 64 through 95 can be used to provide a text description of the parameter. Bytes 96 through 511 are reserved for future use. All reserved values are set to zero. In accordance with another exemplary embodiment, the functionality described above could also be implemented using an ATA SCT command structure and log page.

It is possible to monitor storage device parameter values by polling the device. However, polling adds to the traffic on the bus on which the storage device communicates data with a host processor and responses to polling requests can be delayed by the data on the bus. By departing from the polling paradigm and configuring the device to spontaneously and asynchronously send parameter values to the host processor, performance of the information handling system comprising the host processor and the storage device can be improved. One example of a parameter for which a parameter value can be sent is the temperature of the storage device. It is possible to incorporate a temperature sensor in a storage device itself to obtain a temperature value and to have the storage device itself determine when to send an alert notification comprising the temperature value based on configuration parameters sent to the storage device from the host processor. As an example, the host processor may be a main processor core or, as another example, the host processor may be a controller, such as a management controller for managing environmental and other conditions of the information handling system. As an example, a baseboard management controller (BMC) can receive alert notifications including parameter values, such as a temperature value, from a storage device and can fine-tune fan speeds to the lowest speed required for cooling, and the lowest speed can also reduce acoustic noise. In addition to or as an alternative to the temperature parameter, other storage device parameters can be monitored.

Figure 4:
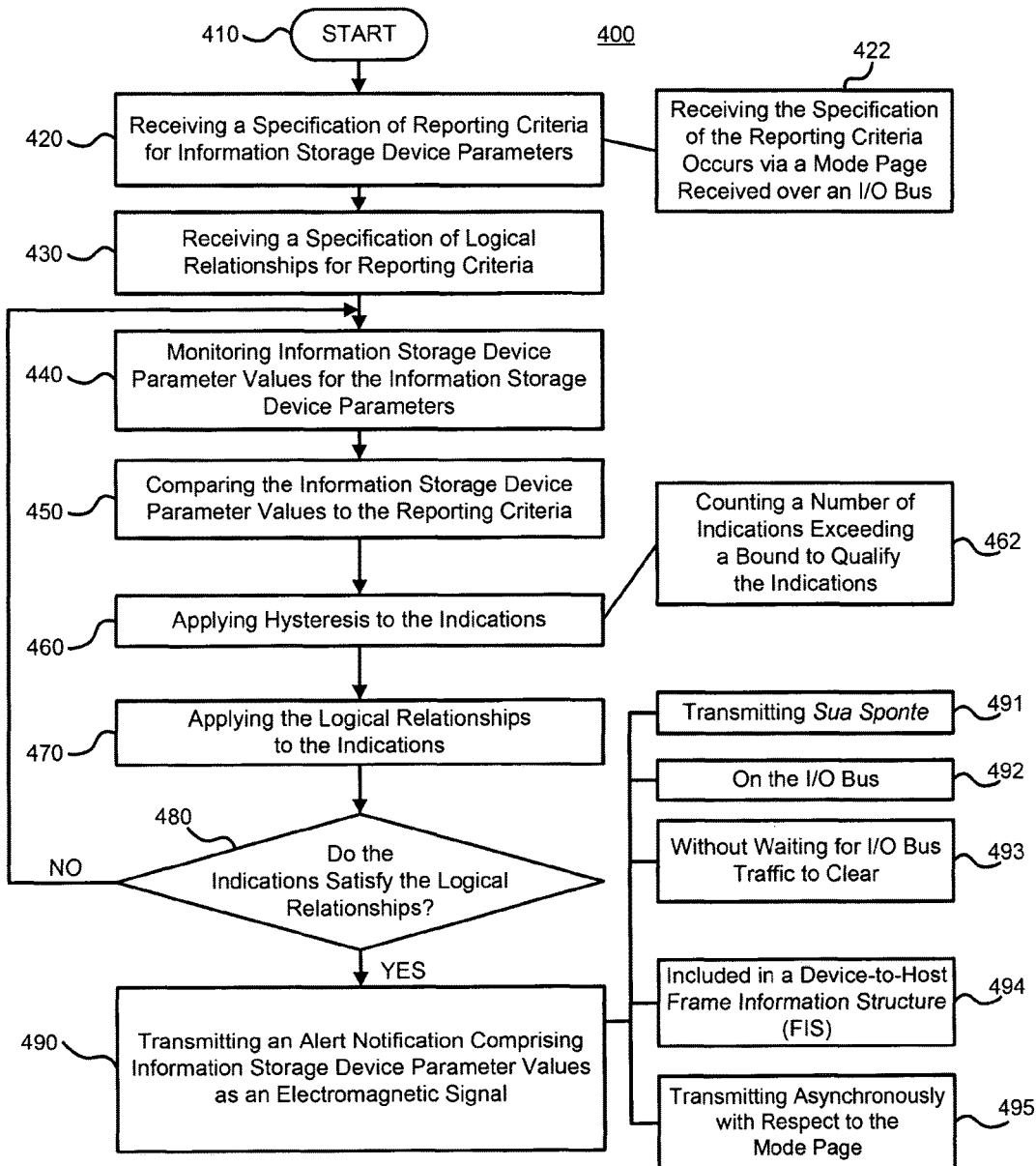
FIG. 4 is a flow diagram illustrating a method according to an embodiment of the present disclosure.

FIG. 4 shows a method 400 that begins at block 419. In block 420, a specification of reporting criteria for information storage device parameters is received. The information storage parameters may include any parameters the values of which are accessible to the information storage device. As examples, the information storage device parameters may include any of temperature, vibration, humidity, barometric pressure, head fly height, information storage device reliability metrics, and the like. The reporting criteria may include upper bounds, lower bounds, a range between a lower bound and an upper bound, ranges beyond an upper bound and a lower bound, values to which information storage device parameters are compared for equality, values to which information storage device parameters are compared for inequality, and the like. As shown by block 422, in accordance with at least one embodiment, the receiving the specification of the reporting criteria for information storage device parameters occurs via a mode page received over an I/O bus. As an example, the mode page may be a SCSI mode page. From block 420, the method continues to block 430. In block 430, a specification of logical relationships for reporting criteria is received. As an example, the logical relationships may be Boolean logical relationships, such as AND, OR, NAND, NOR, XOR, NOT, and the like and may relate instances of reporting criteria to one another.

Such logical relationships may be received with the reporting criteria or separately from the reporting criteria. As an example, the logical relationships may be received on the same mode page as the reporting criteria, on a different mode page as the reporting criteria, or by a different medium than a mode page. From block 430, the method continues to block 440. In block 440, information storage device parameter values for the information storage device parameters are monitored. As an example, an information storage device may autonomously monitor the information storage device parameters pertaining to the reporting criteria. Such monitoring may occur continuously, or the information storage device may periodically measure information storage device parameter values of such information storage device parameters. From block 440, the method continues to block 450. In block 450, the information storage device parameter values are compared to the reporting criteria. As an example, the information storage device may compare each of the reporting criteria to its corresponding information storage device parameter to obtain indications of whether or not the reporting criteria have been satisfied by the information storage device parameter values.

From block 450, the method continues to block 460. In block 460, hysteresis is applied to the indications. As shown by block 462, in accordance with at least one embodiment, applying hysteresis to the indications may be performed by counting a number of indications exceeding a bound to qualify the indications. As an example, the counting may be a counting of units of time during which the indications show the reporting criteria to be satisfied, a counting of numbers of indications showing the reporting criteria to be satisfied, a counting of a rate at which the indications show the reporting criteria to be satisfied, or the like. From block 460, the method continues to block 470. In block 470, the logical relationships are applied to the indications. As an example, a logical operator, such as an AND, OR, NAND, NOR, XOR, or NOT may be applied to a first of the reporting criteria and a second of the reporting criteria. If additional reporting criteria are specified, a logical operator may be applied to an additional one of the additional reporting criteria and the result of the applying the previous logical operator to the previous reporting criteria until logical operators have been applied to all of the specified reporting criteria.

From block 470, the method continues to decision block 480. In decision block 480, a decision is made whether or not the indications satisfy the logical relationships. If not, the method returns to block 440. If so, the method continues to block 490. In block 490, an alert notification comprising information storage device parameter values is transmitted as an electromagnetic signal. As shown by block 491, in accordance with at least one embodiment, the information storage device may transmit the alert notification sua sponte. As shown by block 492, in accordance with at least one embodiment, the information storage device may transmit the alert notification on the I/O bus. As shown by block 493, the information storage device may transmit the alert notification without waiting for I/O bus traffic to clear. As shown by block 494, the alert notification may be included in a device-to-host frame information structure (FIS). As shown by block 495, the information storage device may transmit the alert notification asynchronously with respect to the mode page.

Figure 5:
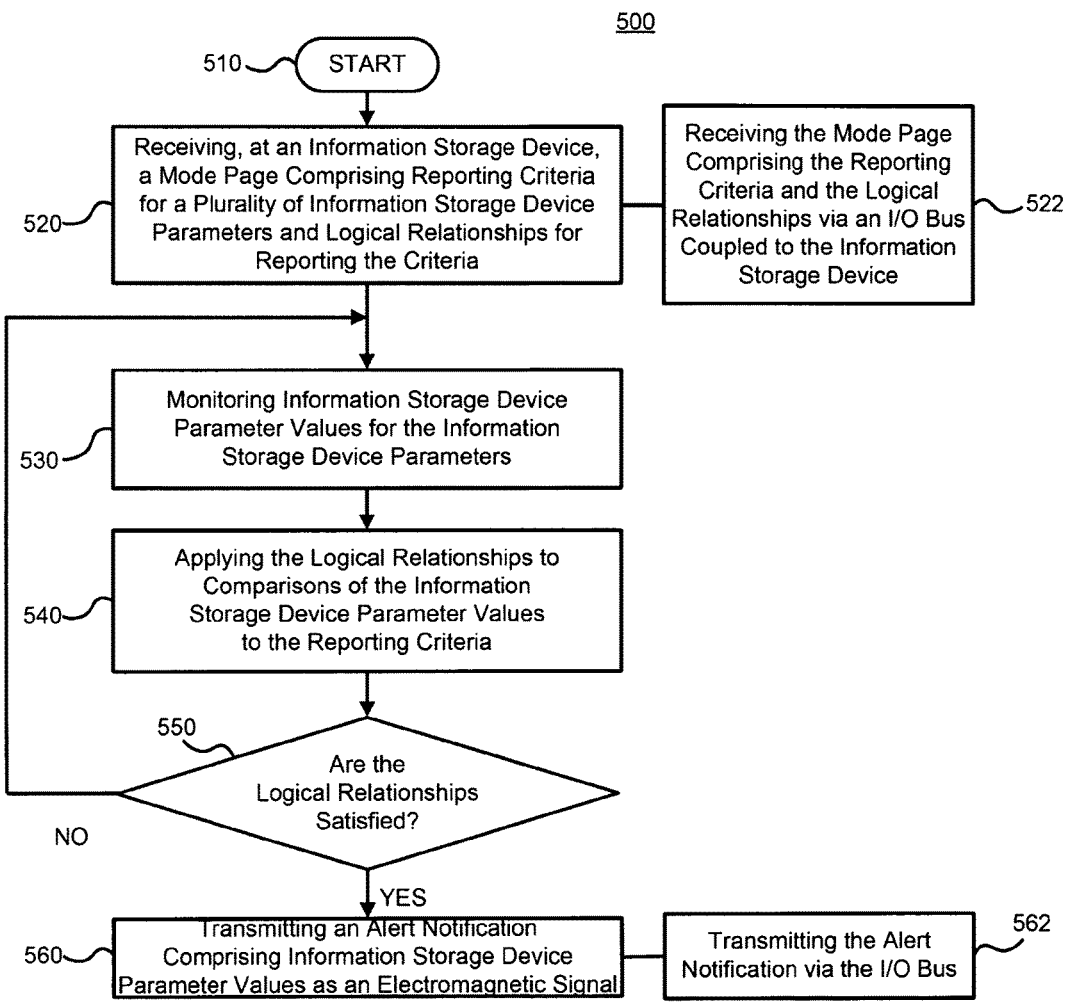
FIG. 5 is a flow diagram illustrating a method according to an embodiment of the present disclosure.

FIG. 5 shows a method 500 that begins at block 510. In block 520, an information storage device receives a mode page comprising reporting criteria for a plurality of information storage device parameters and logical relationships for the reporting criteria. From block 520, the method continues to block 530. In block 530, the information storage device monitors information storage device parameter values for the plurality of information storage device parameters. From block 530, the method continues to block 540. In block 540, the information storage device applies the logical relationships to comparisons of the information storage device parameter values to the reporting criteria. From block 540, the method continues to decision block 550. In decision block 550, a decision is made as to whether or not the logical relationships are satisfied. If not, the method returns to block 530. If so, the method continues to block 560. In block 560, the information storage device transmits an alert notification comprising information storage device parameter values as an electromagnetic signal. As shown in block 562, in accordance with at least one embodiment, the information storage device may transmit the alert notification via an I/O bus, wherein the I/O bus is coupled to the information storage device.

Figure 6:
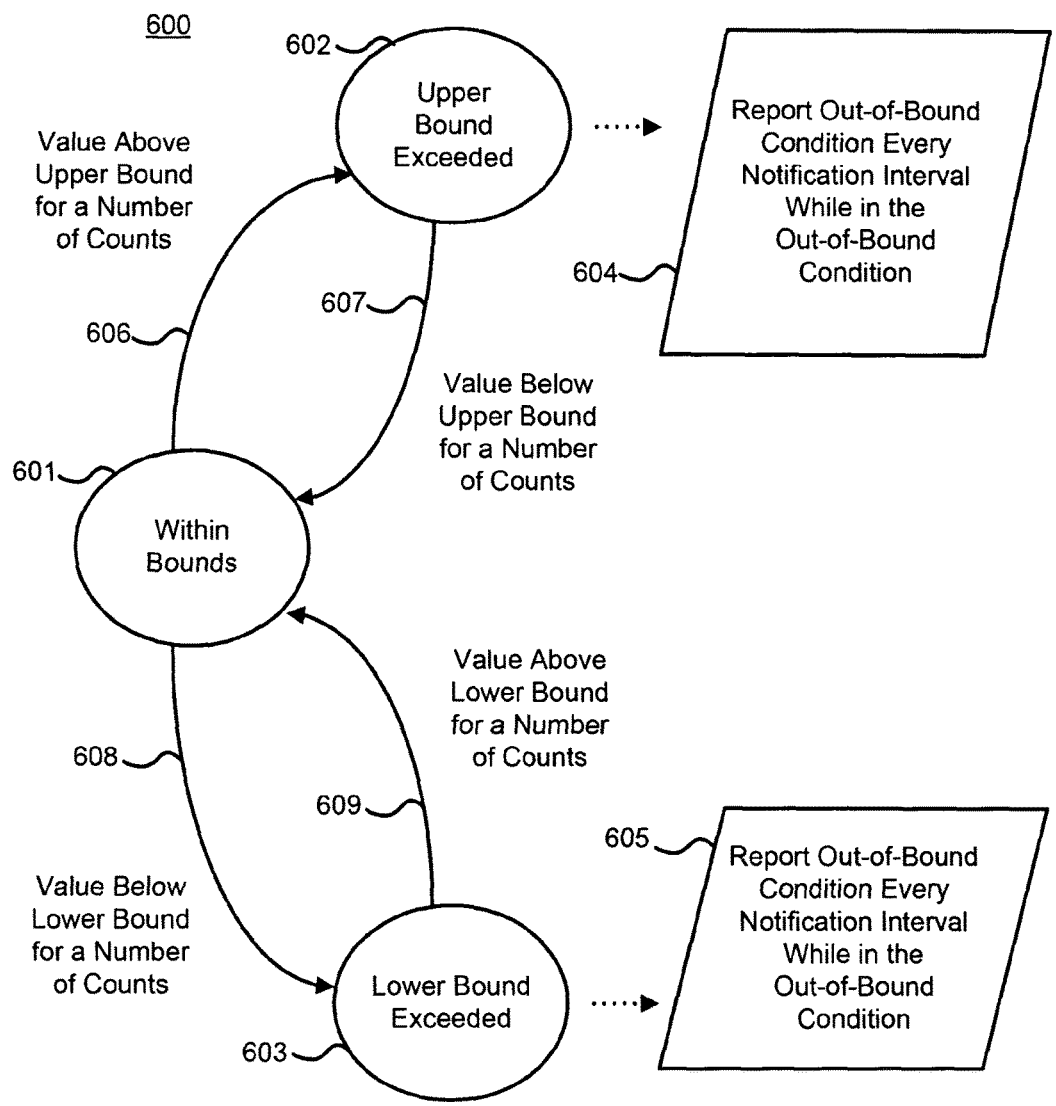
FIG. 6 is a state diagram illustrating a finite state machine (FSM) illustrated as having three states and four paths between states according to an embodiment of the present disclosure.

FIG. 6 shows a finite state machine (FSM) 600 having three states and four paths between states according to an embodiment of the present disclosure. When an information storage device parameter value is within bounds (such as a lower bound and an upper bound), the FSM 600 remains in state 601. While the FSM 600 is in state 601, if the information storage device parameter value exceeds an upper bound for a specified number of counts (such as measurements), the FSM 600 enters state 602, showing that the upper bound has been exceeded. Otherwise, the FSM 600 remains in state 601. While the FSM 600 is in state 602, if the information storage device parameter value is below the upper bound for a specified number of counts (such as measurements), the FSM 600 enters state 601, showing that the information storage device parameter value is within bounds. Otherwise, the FSM 600 remains in state 602. While the FSM 600 is in state 601, if the information storage device parameter value is below a lower bound for a specified number of counts (such as measurements), the FSM 600 enters state 603, showing that the lower bound has been exceeded. Otherwise, the FSM 600 remains in state 601. While the FSM 600 is in state 603, if the information storage device parameter value is above the lower bound for a specified number of counts (such as measurements), the FSM 600 enters state 601. Otherwise the FSM 600 remains in state 603.

In response to the FSM 600 entering state 602, the information storage device reports an out-of-bound condition by sending an alert notification comprising information storage device parameter values every notification interval while the out-of-bound condition persists (such as while the FSM 600 remains in state 602), as indicated by block 604. In response to the FSM 600 entering state 603, the information storage device reports an out-of-bound condition by sending an alert notification comprising information storage device parameter values every notification interval while the out-of-bound condition persists (such as while the FSM 600 remains in state 603), as indicated by block 605.

FIG. 7 shows a mode page 700 that includes a number of bytes (such as bytes 710-721). Each byte comprises a number of bits (such as bits 701-708). In the illustrated example, the twelve bytes of eight bits each provides a mode page comprising 96 bits of information. Some of the information of the mode page 700 identifies, describes, or otherwise aids in processing of the mode page 700, such as page code 731, shown as being expressed in the six least significant bits (LSBs) of byte 710, and page length 736, shown as being expressed in byte 711. Some of the information of the mode page 700 provides specifications of reporting criteria, such as positive parameter value range 753, shown as being expressed in byte 717, and negative parameter value range 754, shown as being expressed in byte 718. Mode page 700 may also include information to qualify the relationship of information storage device parameter values to reporting criteria, such as hysteresis count value 746. Mode page 700 may also include information specifying logical relationships between indications obtained from comparing information storage device parameter values to reporting criteria. Such logical relationships may be used to make alert notifications including reporting of information storage parameter values conditioned upon multiple reporting criteria and the information storage parameter values to which they are being compared.

In the exemplary embodiment depicted in FIG. 7, the mode page 700, which may be implemented, for example, as a SCSI mode page, comprises page code 731, subpage format (SPF) bit 732, parameters saveable (PS) bit 733, page length value 736, reserved area 741, method of reporting informational exceptions override (MRIEO) value 742, temperature notification enable (TNE) bit 743, current temperature as base (CTB) bit 744, hysteresis count value 746, internal update frequency timescale (IUFT) value 747, reserved area 748, notification interval value 751, baseline parameter value 752, positive parameter value range 753, negative parameter value range 754, current parameter value 755, positive range excursion (PRE) bit 761, negative range excursion (NRE) bit 762, reserved area 763, temperature-activated mode (TAM) code 764, and TAM bit 765. The parameter may be any parameter that may be monitored using information accessible to the information storage device, for example, temperature, vibration, head flight height, diagnostic data, and the like. As an example, information elements of the mode page will be described below with respect to temperature notification behavior. Such a mode page may be implemented and stored in the SCSI target device while being manipulated by an initiator. A bit, such as one of the bits in reserved area 741, reserved area 748, or reserved area 763, may be used indicate whether the current parameter value is to be returned in an alert notification based on criteria set forth in mode page 700.

If set, the current temperature as base (CTB) bit 744 indicates that the device server should use the current temperature reading as the baseline temperature. If the temperature notification enable (TNE) bit=0, then the internal update process is disabled, and no temperature notification is made. If TNE bit=1, then notification of temperature changes shall be made at the intervals specified by the notification interval value as long as the temperature of the device falls outside the extent of the positive parameter value range or the negative parameter value range. Notification shall stop if the temperature of the device changes so as to fall within the extent of the positive parameter value range or the negative parameter value range.

A method of reporting informational exceptions override (MRIEO) value indicates that the device server should asynchronously report temperature changes as specified in this page regardless of the method of reporting informational exceptions (MRIE) setting in the information exceptions control mode page.

An internal update frequency timescale (IUFT) value specifies the units of time to apply to the internal update frequency. The values are defined as follows: a hysteresis count (HystCount) value specifies the number of times that the temperature reading measured by the internal update must be outside the specified temperature boundary before initiating the notification process, if the previous temperature reading had been inside the boundary. A notification interval value specifies the time interval to be used when reporting successive out-of-bound temperature conditions. An internal update frequency value specifies the interval for the device to use for the measurement of its temperature. A baseline temperature value specifies the temperature values (in degrees C.) from which the positive range value and the negative range value will extend. Any internal temperature value within this range will not cause an asynchronous notification. As an example, the baseline temperature may be a 16-bit signed value.

A positive parameter value range, which may, for example, be specified in degrees Celsius, provides the portion of the nominal temperature range above the Baseline Temperature. A negative parameter value range, which may, for example, be specified in degrees Celsius, provides the portion of the nominal temperature range below the baseline temperature value. A setting of FFh disables the reporting of temperature excursion for that range. A current temperature value is the temperature measured at the time the notification is made. A temperature-activated mode (TAM) bit is a flag that, when set to 1, indicates that the device is currently operating in a special mode that was activated by a high or low temperature condition. An example is that the TAM bit may be active when the information storage device is configured to use artificially increased seek times for the purpose of allowing voice coil motor cooling. A TAM code is set by the device to indicate the type(s) of temperature-activated modes in which the drive is currently operating. A negative range excursion (NRE) bit is a flag set by the device to indicate that the internal temperature is currently outside the negative temperature boundary. The NRE bit is set to 1 when the negative temperature boundary is exceeded, and is cleared to 0 when the temperature is inside the negative temperature boundary. A positive range excursion (PRE) bit is a similar flag for the positive temperature boundary. The temperature notification shall be made using SCSI sense data, or other methods. The temperature notification data includes information such as the current temperature, whether it is a positive or negative range excursion, the number of degrees beyond the positive or negative range, and, optionally, information on the previous notification (such as previous temperature, amount of temperature change since the previous notification, time interval since the previous notification, and the like). It may also report the contents of the temperature notification mode page.

FIG. 8 shows a Self-Monitoring, Analysis and Reporting Technology (SMART) error log page as may represent information of log 209 of FIG. 2 in accordance with at least one embodiment. SMART error log page 800 begins with byte 0, which identifies a SMART error log version. Byte 1 provides an error log index. Bytes 2-91 are occupied by a first error log data structure. Bytes 92-181 are occupied by a second error log data structure. Bytes 182-271 are occupied by a third error log data structure. Bytes 272-361 are occupied by a fourth error log data structure. Bytes 362-451 are occupied by a fourth error log data structure. Bytes 452 and 453 provide a device error count. Bytes 454-510 are reserved for future use. Byte 511 contains a data structure checksum.

In accordance with at least one embodiment, an asynchronous notification mechanism for communication of information storage device status communication is provided. In accordance with at least one embodiment, an information storage device collects and reacts to temperature or other parameter value changes in a much more timely manner than with a polling mechanism. In accordance with at least one embodiment, fine grain control of the detection and notification, including the timing of the notification, of information storage device status changes by the information storage device itself is provided. At least one embodiment avoids the need to interrogate/poll the end device for temperature information by implementing independent programmable thermal monitoring within the end-device. As the temperature fluctuates the end-device may asynchronously notify the controller of the change, per the programmed settings. The interface to configure this behavior in the end-device complies with existing standards, while being robust enough to support many varied adaptations. At least one embodiment uses programming a mode page, such as a SCSI mode page, for setting parameters and uses sense information, such as SCSI sense information, for transmission of information from the drives.

At least one embodiment provides real-time temperature change feedback into the thermal control system. The end-device provides thermal updates in response to the temperature crossing certain programmed thermal boundaries, or in response to the temperature changing by a programmed amount from the previous reported temperature.

In accordance with at least one embodiment, new functionality is provided for boundary condition reporting by information storage devices. For example, an information storage device may allow programmable criteria and programmable logical relationships of such criteria and may, for example, use an interface signal (such as connector pin P11, distinct from the normal data and control communication path—"Out of Band") as a means of notifying a system processor that the information storage device is currently exceeding an operating condition boundary. The system processor can query the information storage device to determine the reason for the notification.

In accordance with at least one embodiment, an alert notification is sent from an information storage device as SCSI sense data. An alert notification sent as SCSI sense data can be read and interpreted by a storage controller communicatively coupled to the information storage device or passed on to a control system interface further up a software stack. In accordance with at least one embodiment, the software stack may be software stack of the storage controller. In accordance with at least one embodiment, the software stack may be a software stack of a general purpose processor communicatively coupled to the storage controller. While the term "software stack" is used, the execution of instruction-based program code on the apparatus on which the software stack is implemented may be considered an implementation of a special-purpose apparatus to perform the function of the software stack. As an example, the execution of instruction-based program code on a general-purpose processor to implement the software stack may allow the general-purpose processor to act, with respect to the functionality of the software stack, as special-purpose apparatus to provide such functionality. One example of a communication channel between such special-purpose apparatus (such as a service processor used to implement a software stack) and a storage controller is an I2C-based communication interface. In another example, a software stack implemented on a processor may communicate with a storage controller via a defined host programming interface for management purposes.

In accordance with at least one embodiment, the HDD/SSD itself takes on new functionality beyond a simple alert that a boundary condition has been exceeded. The following parameters can be programmed and used by the information storage device to determine when an alert needs to be sent: a settable boundary; both an upper bound and a lower bound; controlled hysteresis; criteria pertaining to multiple information storage device parameters, even parameters available only internally within the information storage device; programmable logical relationships of the criteria; interaction with the information storage device's SMART alert subsystem; programmable dependency on a level of activity of the information storage device.

As an example, a settable boundary may be communicated to the information storage device, and the information storage device may then autonomously monitor an information storage device parameter to determine if the settable boundary has been crossed. While a fixed boundary provides a pre-programmed fixed alert condition, allowing the alert level to be programmable, operation that is more flexible and more adaptable to dynamic situations may be provided. For example, a system-level policy of allowing warmer operation at an acceptable lowered MTBF may make sense in some situations. Allowing the drive to be programmed with the temperature limit permits the same drive to be used in multiple temperature environments.

As another example, both an upper bound and a lower bound can be set as alert conditions. For example, in fresh air cooling data center operations where an idling drive might cool down during a frigid night to a temperature below its optimal operating bound, a lower bound could alert a system processor to initiate activity with the drive to warm it up before it becomes fully operational and an upper bound could alert the system processor of excessive temperatures, which might be caused, for example, by a fan failure, among many other possible causes.

As another example, controlled hysteresis may be provided to qualify indications that, once qualified, may result in an alert notification being issued. As lack of controlled hysteresis in closed loop systems (such as cooling fan speed control) may lead to instability, adding controlled hysteresis can assure stability. For example, the information storage device can be programmed to withhold the reporting of a boundary-exceeded condition until the transition has been stable for a programmable amount of time.

As another example, numerous conditions may be monitored. Such conditions may include environmental conditions (such as temperature, humidity, barometric pressure, vibration, and the like), conditions for which information is communicated outside the information storage device, and conditions for which information is not communicated outside the information storage device. Accordingly, any arbitrary condition can be monitored. As an example, whether or not the fly height of the read/write head is close to a limit may be monitored. As another example, whether or not the operating lifetime of a solid-state disk (SSD) device is close to being reached may be monitored.

As another example, programmable boundary types may be monitored. A boundary (or more than a single boundary) can be programmed beyond a simple "threshold exceeded" boundary. For example, a boundary can be based on time, event count, or event rate (such as frequency of occurrence of a particular event). As an example, an alert notification can be tied to any internal drive condition (or combination of conditions) regardless of whether or not it is normally exposed outside the device. As an example, an alert notification may be conditioned upon a logical combination of a "vibration boundary" AND a "raw bit error rate" OR a "position error" signal level.

As another example, an alert notification can be tied to the storage device's Self-Monitoring, Analysis, and Reporting Technology (SMART) alert subsystem. An embodiment applied to the SMART subsystem, either alone or in combination with other alert notification criteria, could eliminate the need for polling the drive for SMART trips. For example, polling an information storage device for SMART trips may happen 12×60×24=17,280 times each day for each storage device, and there may be, for example, 24 drives in a chassis, such as in an exemplary Dell PERC configuration, so avoiding the need for such polling could avoid a significant amount of communication with storage devices.

As another example, alert notification criteria may be tied to a drive's level of activity. For example, a drive may be programmed to withhold an alert notification for temperature or vibration if the drive's duty cycle is decreasing (which may, for example, lead naturally to a decrease in the drive's operating temperature). Programming a drive to consider its state and any operational trends it may be experiencing can further reduce the need to poll the device and thereby avoid interrupting the efficient sequencing of I/O commands within the drive's command queue.

In accordance with at least one embodiment, power savings can be realized by reducing communications with information storage devices, for example, by reducing or eliminating polling of the status of the information storage devices. As another example, power savings can be realized by utilizing "fresh air" cooling, where information handling systems may be operated over a broad range of temperatures, with more detailed environmental information from information storage devices allowing the information handling systems to coordinate system activities, such as the operation of cooling fans and the operation of information storage devices to optimize performance over the broad range of temperatures at which the systems may operate.

At least one embodiment may be used to provide embedded (such as agent-less) server management. By facilitating effective communication of alert notification criteria and alert notifications between a processor of an information handling system and an information storage device of the information handling system, at least one embodiment may be used to provide management of the information storage device without the need for the processor to actively solicit (such as poll) status information from the information storage device on an ongoing basis. In accordance with at least one embodiment, higher performance may be obtained by minimizing the overhead of additional information communicated to obtain the status information from the information storage device, and faster response to changes in status information can be obtained by allowing the information storage device to transmit an alert notification quicker than it would be able to respond to a polling request under a polling-based paradigm.

At least one embodiment may be implemented for an information storage device that uses at least a portion of a SCSI command set for communication of information via its I/O bus. As an example, the information storage device may receive alert notification criteria and logical relationships to be applied to the alert notification criteria via at least a portion of a SCSI command set, for example, via a SCSI mode page transmitted via the I/O bus. As another example, the information storage device may transmit an alert notification using at least a portion of a SCSI command set, for example, via SCSI sense data transmitted via the I/O bus. Alternatively, the information storage device may receive alert notification criteria and logical relationships to be applied to the alert notification criteria using at least a portion of a SCSI command set, for example, via a SCSI mode page transmitted via the IO bus, but transmit an alert notification via an electrical conductor distinct from the IO bus, thereby allowing alert notification to avoid impairing the bandwidth of the IO bus.

At least one embodiment asynchronously provides alert notifications in response to parameter changes rather than requiring polling. Such an embodiment may be implemented by configuring the information storage devices to autonomously monitor parameter values, to autonomously compare the parameter value to reporting criteria, to autonomously apply logical relationships to indications obtained by such comparisons, and to autonomously provide an alert notification in response to the satisfying of such logical relationships; by configuring the storage controller to receive such alert notifications and to pass the alert notifications to control subsystems, such as the thermal control subsystem; and by configuring the control subsystems to receive such alert notifications and act upon them to obtain detailed information concerning the cause of a alert notification and to perform appropriate control functions in response to receiving the alert notifications or the detailed information.

While embodiments have been described herein with respect to storage technology, such as hard disk drives and flash drives, other embodiments may be applied to other devices of information handling systems that incorporate or have access to sensor data or other parameter values applicable to management of the environmental, electrical, mechanical, and other conditions of the information handling system.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (such as random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
   a processor;
   a memory communicatively coupled to the processor; and
   an information storage device communicatively coupled to the processor via an input/output (I/O) bus for communicating I/O data between the processor and the information storage device, the information storage device configured to receive a specification of reporting criteria for a plurality of information storage device parameters, to receive a specification of logical relationships for the reporting criteria, to monitor information storage device parameter values for the information storage device parameters, to compare the information storage device parameter values to the reporting criteria to obtain indications of whether the reporting criteria have been satisfied, to apply the logical relationships to the indications and, in response to the logical relationships applied to the indications yielding a first result, to transmit an alert notification to the processor, the alert notification including the information storage device parameter values, wherein, when traffic is present on the I/O bus, the alert notification comprising the information storage device parameter values is included as part of a return status being sent from the information storage device to the processor in response to a command issued by the processor to the information storage device, and, when traffic is not present on the I/O bus, a separate message is generated to convey the alert notification comprising the information storage device parameter values from the information storage device to the processor.

2. The information handling system of claim 1, wherein the information storage device is configured to transmit the alert notification to the processor via the I/O bus.

3. The information handling system of claim 1, wherein the information storage device is configured to transmit the alert notification comprising the information storage device parameter values to the processor without requiring the processor to send a request for the information storage device parameters in response to the alert notification.

4. The information handling system of claim 1, wherein alert notification comprising the information storage device parameter values is included in a device-to-host serial advanced technology attachment (SATA) frame information structure (FIS).

5. The information handling system of claim 1, wherein the alert notification comprising the information storage device parameter values is included in a new device-to-host serial advanced technology attachment (SATA) frame information structure (FIS) distinct from an existing device-to-host SATA FIS.

6. The information handling system of claim 1, wherein the processor is a management controller.

7. A method comprising:
receiving, at an information storage device, a specification of reporting criteria for a plurality of information storage device parameters;
receiving a specification of logical relationships for the reporting criteria;
monitoring information storage device parameter values for the information storage device parameters;
comparing the information storage device parameter values to the reporting criteria to obtain indications of whether the reporting criteria have been satisfied;
applying the logical relationships to the indications; and
in response to the logical relationships applied to the indications yielding a first result, transmitting an alert notification including information storage device parameter values as an electromagnetic signal, wherein the alert notification comprising the information storage device parameter values is included in a device-to-host serial advanced technology attachment frame information structure.

8. The method of claim 7 wherein, when traffic is present on an I/O bus coupled to the information storage device and to a processor, the alert notification comprising the information storage device parameter values is included as part of a return status being sent from the information storage device to the processor in response to a command issued by the processor to the information storage device, and, when traffic is not present on the I/O bus, a separate message is generated to convey the alert notification comprising the information storage device parameter values from the information storage device to the processor.

9. The method of claim 7 wherein the information storage device is configured to transmit the alert notification to a processor via an I/O bus coupled to the information storage device and to the processor.

10. The method of claim 7 wherein the information storage device is configured to transmit the alert notification comprising the information storage device parameter values to a processor without requiring the processor to send a request for the information storage device parameters in response to the alert notification.

11. The method of claim 7, wherein the serial advanced technology attachment (SATA) frame information structure (FIS) is distinct from an existing device-to-host SATA FIS.

12. The method of claim 7, wherein a processor coupled to the information storage device is a management controller.

13. A method comprising:
receiving, at an information storage device, reporting criteria for a plurality of information storage device parameters and logical relationships for the reporting criteria;
monitoring information storage device parameter values for the information storage device parameters; and
in response to the logical relationships applied to comparisons of the information storage device parameter values to the reporting criteria, transmitting an alert notification including information storage device parameter values as an electromagnetic signal in the form of a single contiguous message for which a corresponding command to send the single contiguous message has not been received by the information storage device, wherein the alert notification comprising the information storage device parameter values is included in a device-to-host serial advanced technology attachment frame information structure.

14. The method of claim 13, wherein, when traffic is present on an I/O bus coupled to the information storage device, the alert notification comprising the information storage device parameter values is included as part of a return status being sent from the information storage device to a processor in response to a command issued by the processor to the information storage device, and, when traffic is not present on the I/O bus, a separate message is generated to convey the alert notification comprising the information storage device parameter values from the information storage device to the processor.

15. The method of claim 13, wherein the information storage device is configured to transmit the alert notification comprising the information storage device parameter values to a processor without requiring the processor to send a request for the information storage device parameters in response to the alert notification.

16. The method of claim 13, wherein the transmitting the alert notification as the electromagnetic signal occurs asynchronously with respect to commands received by the information storage device over the I/O bus.

17. The method of claim 13, wherein the alert notification comprising the information storage device parameter values is included in a new device-to-host serial advanced technology attachment (SATA) frame information structure (FIS) distinct from an existing register device-to-host SATA FIS.

* * * * *